(12) United States Patent
Lowe et al.

(10) Patent No.: US 11,686,567 B2
(45) Date of Patent: Jun. 27, 2023

(54) HANDRAIL INSTALLATION DEVICE

(71) Applicants: Blane Lowe, Firestone, CO (US);
Charles A Cox, Firestone, CO (US)

(72) Inventors: Blane Lowe, Firestone, CO (US);
Charles A Cox, Firestone, CO (US)

( * ) Notice: Subject to any disclaimer, the term of this patent is extended or adjusted under 35 U.S.C. 154(b) by 0 days.

(21) Appl. No.: 17/504,220

(22) Filed: Oct. 18, 2021

(65) Prior Publication Data

US 2023/0117811 A1 Apr. 20, 2023

(51) Int. Cl.
*G01B 5/14* (2006.01)
*E04F 21/00* (2006.01)

(52) U.S. Cl.
CPC ............... *G01B 5/14* (2013.01); *E04F 21/00* (2013.01)

(58) Field of Classification Search
CPC ................................. G01B 5/14; E04F 21/00
See application file for complete search history.

(56) References Cited

U.S. PATENT DOCUMENTS

| | | | | |
|---|---|---|---|---|
| 392,508 A | * | 11/1888 | Gates | G01B 3/56 33/419 |
| 5,438,761 A | * | 8/1995 | Krumszyn | G01B 3/56 33/375 |
| 5,440,818 A | * | 8/1995 | Mailhot | B25H 7/02 33/462 |
| 5,491,905 A | * | 2/1996 | Jablonski | E04F 21/00 33/481 |
| 5,527,016 A | * | 6/1996 | Wilkerson, Jr. | E04F 21/00 52/64 |
| 5,617,642 A | * | 4/1997 | Marios | E04F 21/20 33/526 |
| 5,809,659 A | * | 9/1998 | Martin | B25H 7/00 33/421 |
| 6,173,503 B1 | * | 1/2001 | Houghton | E04G 21/1891 33/613 |
| 6,260,283 B1 | * | 7/2001 | Abernathy | B43L 7/12 33/484 |
| 7,159,328 B1 | * | 1/2007 | Duda | B43L 7/14 33/484 |
| 8,807,537 B1 | * | 8/2014 | Vorrath | E04F 21/26 52/127.2 |
| 10,900,245 B2 | * | 1/2021 | Bunn, Jr. | E04F 11/1802 |
| 2004/0181955 A1 | * | 9/2004 | Sargent | B43L 7/10 33/473 |
| 2020/0347623 A1 | * | 11/2020 | Bunn, Jr. | E04F 21/26 |
| 2022/0120089 A1 | * | 4/2022 | Dellorto | G01B 3/56 |

* cited by examiner

*Primary Examiner* — Yaritza Guadalupe-McCall
(74) *Attorney, Agent, or Firm* — The Iwashko Law Firm, PLLC; Lev Ivan Gabriel Iwashko

(57) ABSTRACT

A handrail installation device, including a first arm removably connected to at least a portion of a stair tread, a second arm pivotally disposed at a first end on at least a portion of the first arm to rotate from retracted in parallel with the first arm in a first position to at least partially extended away from the first arm in a second position, and rotate from extended away from the first arm in the second position to retracted in parallel with the first arm in the first position, and a bubble level disposed on at least a portion of the second arm to identify a level surface based on a position of at least one of the first arm and the second arm.

9 Claims, 1 Drawing Sheet

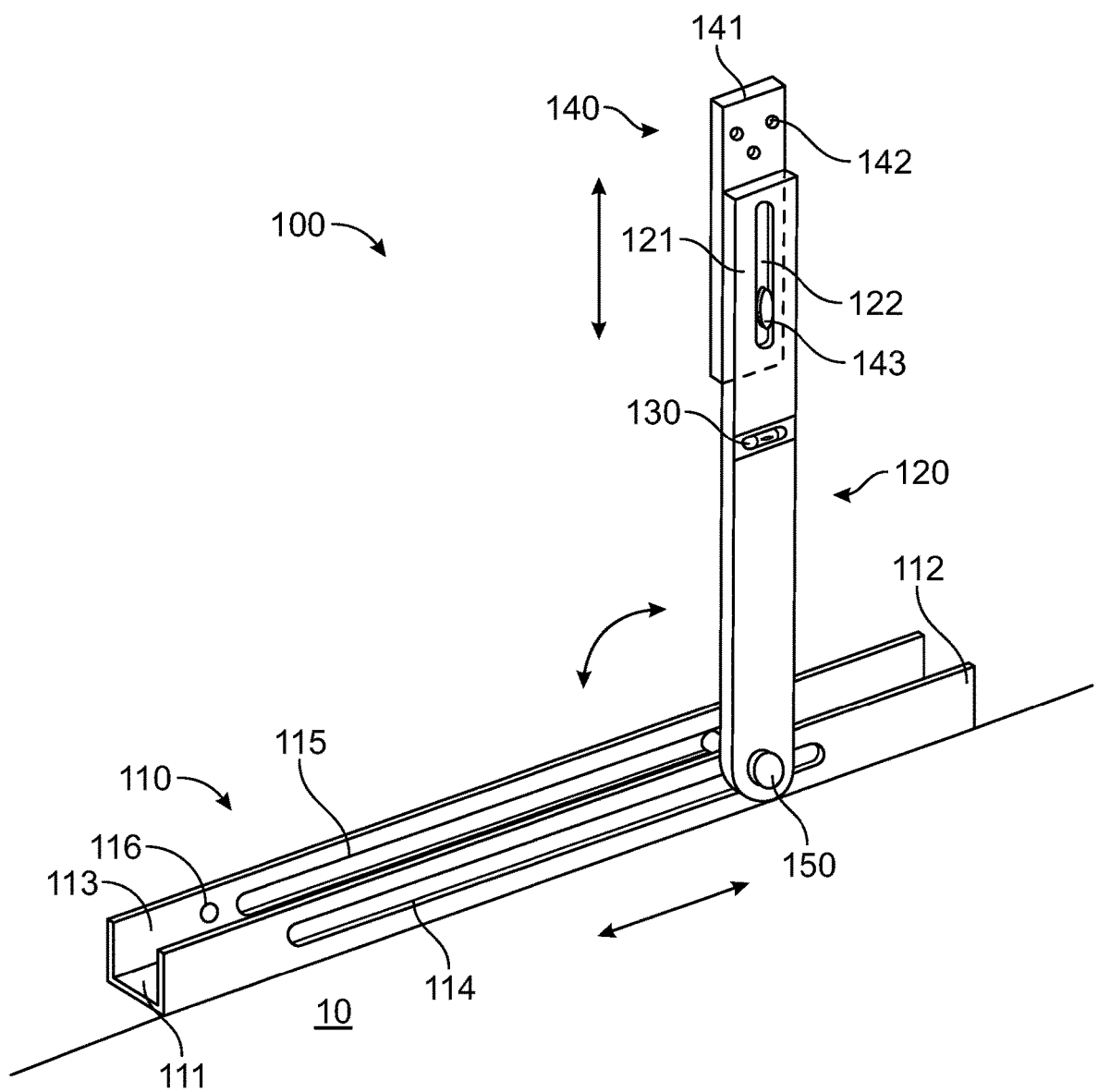

HANDRAIL INSTALLATION DEVICE

BACKGROUND

1. Field

The present general inventive concept relates generally to handrail installation, and particularly, to a handrail installation device.

2. Description of the Related Art

Due to human innovation, new homes and other buildings are developing rapidly. However, the traditional procedure for installing the railing of stairways is tedious and often results in repeated measurements and inaccuracies. For example, most stairway railing requires a combination of a level and/or a ruler to create straight edges on walls during installation of a handrail. Thus, installation of the handrail can become a complicated and time-consuming process for professional contractors.

Therefore, there is a need for a handrail installation device that facilitates marking and installing handrails.

SUMMARY

The present general inventive concept provides a handrail installation device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a handrail installation device, including a first arm removably connected to at least a portion of a stair tread, a second arm pivotally disposed at a first end on at least a portion of the first arm to rotate from retracted in parallel with the first arm in a first position to at least partially extended away from the first arm in a second position, and rotate from extended away from the first arm in the second position to retracted in parallel with the first arm in the first position, and a bubble level disposed on at least a portion of the second arm to identify a level surface based on a position of at least one of the first arm and the second arm.

The first arm may include a base, a first side perpendicularly disposed away from a first edge of the base with respect to a direction, and a second side perpendicularly disposed away from a second edge of the base with respect to the direction.

The first arm may further include a first groove disposed on and within at least a portion of the first side to at least partially extend a length of the first side, and a second groove disposed on and within at least a portion of the second side to at least partially extend a length of the second side.

The second arm may include an arm body having an elongate shape, and a height groove disposed on at least a portion of the arm body to extend at least a portion of a length of the arm body.

The handrail installation device may further include a height adjusting section movably connected to at least a portion of the second arm to move toward the first end of the second arm in a first direction, and move toward a second end of the second arm in a second direction opposite with respect to the first direction.

The height adjusting section may include an adjusting body, and a sliding bolt movably disposed on at least a portion of the adjusting body and connected to the second arm to move the adjusting body toward the first end of the second arm in the first direction, and move the adjusting body toward the second end of the second arm in the second direction opposite with respect to the first direction in response to movement of the sliding bolt.

The sliding bolt may include a detent to prevent the sliding bolt from automatically moving.

The handrail installation device may further include a tightening bolt slidably disposed on and within at least a portion of the first arm to slide from a first end of the first arm to at least partially toward a second end of the first arm, and slide from the second end of the first arm to at least partially toward the first end of the first arm.

The tightening bolt may be prevented from sliding along the first arm in response to rotating in the a first rotating direction, and facilitates sliding along the first arm in response to rotating in a second rotating direction opposite with respect to the first rotating direction.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates an isometric top view of a handrail installation device, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

List of Components
Handrail Installation Device 100
First Arm 110
Base 111
First Side 112
Second Side 113
First Groove 114
Second Groove 115
Fastener Receiving Aperture 116
Second Arm 120
Arm Body 121
Height Groove 122
Bubble Level 130
Height Adjusting Section 140
Adjusting Body 141
Fastener Receiving Apertures 142
Sliding Bolt 143
Tightening Bolt 150

FIG. 1 illustrates an isometric top view of a handrail installation device 100, according to an exemplary embodiment of the present general inventive concept.

The handrail installation device 100 may be constructed from at least one of metal, plastic, wood, glass, liquid, and rubber, etc., but is not limited thereto.

The handrail installation device 100 may include a first arm 110, a second arm 120, a bubble level 130, a height adjusting section 140, and a tightening bolt 150, but is not limited thereto.

Referring to FIG. 1, the first arm 110 is illustrated to have a rectangular shape. However, the first arm 110 may be circular, conical, triangular, pentagonal, hexagonal, heptagonal, octagonal, or any other shape known to one of ordinary skill in the art, but is not limited thereto. Also, the first arm 110 may have an elongate shape.

The first arm 110 may include a base 111, a first side 112, a second side 113, a first groove 114, a second groove 115, and a fastener receiving aperture 116, but is not limited thereto.

The base 111 may be removably connected to at least a portion of a stair tread 10. Moreover, the base 111 may be planar and parallel to a plane of the stair tread 10 and/or a handrail.

The first side 112 may be perpendicularly disposed away from a first edge of the base 111 with respect to a direction. Similarly, the second side 113 may be perpendicularly disposed away from a second edge of the base 111 with respect to the direction, such that the second side 113 and/or the first side 112 may be in parallel. Additionally, the second edge of the base 111 may be disposed opposite with respect to the first edge. Also, a length of the first side 112 and/or the second side 113 may be equivalent to a length of the base 111.

Collectively, the base 111, the first side 112, and/or the second side 113 may form a U-shape with respect to an end view of the first arm 110.

The first groove 114 may be disposed on and/or within at least a portion of the first side 112. Moreover, the first groove 114 may extend at least a portion of the length of the first side 112.

The second groove 115 may be disposed on and/or within at least a portion of the second side 113. Moreover, the second groove 115 may extend at least a portion of the length of the second side 113.

The fastener receiving aperture 116 may be disposed on at least a portion of the second side 113. The fastener receiving aperture 116 may receive a fastener and/or a tool therein, such as a drill, a screw, a bolt, and/or a nail. As such, the fastener receiving aperture 116 may receive the fastener to stabilize the first arm 110 against a surface, such as a stair and/or a wall.

The second arm 120 may include an arm body 121 and a height groove 122, but is not limited thereto.

The arm body 121 may have an elongate shape. Additionally, the arm body 121 may be convex shaped (e.g., curved) at a first end and have a flat edge at a second end. The arm body 121 may be movably (i.e., pivotally and/or rotatably) disposed at the first end on at least a portion of the first arm 110. More specifically, the arm body 121 may move from retracted in parallel with the first arm 110 in a first position to at least partially extended away from the first arm 110 in a second position. Conversely, the arm body 121 may move from extended away from the first arm 110 in the second position to retracted in parallel with the first arm 110 in the first position. It is important to note that the convex shape of the first end may facilitate rotation, whereas the flat edge of the second end may be used during measurements and/or installation of a handrail bracket. Also, the arm body 121 may be use to plumb and/or identify a vertical line with respect to the stair tread 10.

The height groove 122 may be disposed on at least a portion of the second end of the arm body 121. The height groove 122 may extend at least a portion of a length of the arm body 121.

The bubble level 130 may be disposed on at least a portion of the arm body 121. The bubble level 130 may identify a level surface based on a position of the first arm 110 and/or the second arm 120. As such, a bubble within the bubble level 130 may move therein to identify the bubble level 130 is level in response to the position of the first arm 110 and/or the second arm 120.

The height adjusting section 140 may include an adjusting body 141. a plurality of fastener receiving apertures 142, and a sliding bolt 143, but is not limited thereto.

The adjusting body 141 may have a length less than a length of the arm body 121. However, the adjusting body 141 may have a width equivalent to a width of the arm body 121. The adjusting body 141 may be movably (i.e., slidably) connected to at least a portion of the arm body 121. More specifically, the adjusting body 141 may move toward the first end of the arm body 121 in a first direction and toward the second end of the arm body 121 in a second direction opposite with respect to the first direction. As such, the adjusting body 141 may adjust a length and/or a height thereof in response to moving along the length of the arm body 121, based on a preference of a user. For example, the adjusting body 141 may adjust a collective length of the adjusting body 141 and/or the arm body 121 between thirty-four and thirty-eight inches, which is standard for most handrails.

The plurality of fastener receiving apertures 142 may be disposed on at least a portion of a first end of the adjusting body 141. Each of the plurality of fastener receiving apertures 142 may receive a fastener and/or a tool therein, such as a drill, a screw, a bolt, and/or a nail. In other words, each of the plurality of fastener receiving apertures 142 may correspond to a position of fasteners for the handrail bracket. As such, the plurality of fastener receiving apertures 142 may identify placement of holes for the handrail bracket. Thus, during use, the arm body 121 may be moved to a location for installation of the handrail bracket and the tool may be used to create holes through the plurality of fastener receiving apertures 142.

The sliding bolt 143 may include a detent (e.g., a ratchet and pawl, or a spring-loaded ball bearing), but is not limited thereto.

The sliding bolt 143 may be movably (i.e., slidably) disposed on and/or within at least a portion of the adjusting body 141 and/or the height groove 122. Moreover, the adjusting body 141 may move in response to movement of the sliding bolt 143. Also, the detent may prevent and/or resist further movement without manual manipulation of the sliding bolt 143. In other words, the detent may keep the sliding bolt 143 in place, after it has been set, such that the sliding bolt 143 does not automatically move without an external application of force.

The tightening bolt 150 may be movably (i.e., slidably) disposed on and/or within at least a portion of the first arm 110. More specifically, the tightening bolt 150 may be connected to the first side 112 and/or the second side 113 through the first groove 114 and/or the second groove 115. Accordingly, the tightening bolt 150 may slide from a first end of the first arm 110 to at least partially toward a second end of the first arm 110. Conversely, the tightening bolt 150 may slide from the second end of the first arm 110 to at least partially toward the first end of the first arm 110.

Furthermore, the tightening bolt 150 may rotate in a first rotating direction (i.e. clockwise) or a second rotating direction (i.e. counterclockwise) to prevent the tightening bolt from sliding along the first groove 114 and/or the second groove 115. Alternatively, the tightening bolt 150 may rotate in the second rotating direction or the first rotating direction to facilitate sliding of the tightening bolt along the first groove 114 and/or the second groove 115. As such, the tightening bolt 150 may be used to adjust a position of the second arm 120 during measurements, and subsequently, stabilizing the second arm 120.

Therefore, the handrail installation device 100 may facilitate installation of the handrail by using the first arm 110 and/or the second arm 120 to identify a position of the handrail and/or the handrail bracket. Also, the handrail installation device 100 may determine a proper angle for installation of the handrail bracket, as well as, minimizing repairs and/or clean up.

The present general inventive concept may include a handrail installation device 100, including a first arm 110 removably connected to at least a portion of a stair tread 10, a second arm 120 pivotally disposed at a first end on at least a portion of the first arm 110 to rotate from retracted in parallel with the first arm 110 in a first position to at least partially extended away from the first arm 110 in a second position, and rotate from extended away from the first arm 110 in the second position to retracted in parallel with the first arm 110 in the first position, and a bubble level 130 disposed on at least a portion of the second arm 120 to identify a level surface based on a position of at least one of the first arm 110 and the second arm 120.

The first arm 110 may include a base 111, a first side 112 perpendicularly disposed away from a first edge of the base 111 with respect to a direction, and a second side 113 perpendicularly disposed away from a second edge of the base 111 with respect to the direction.

The first arm 110 may further include a first groove 114 disposed on and within at least a portion of the first side 112 to at least partially extend a length of the first side 112, and a second groove 115 disposed on and within at least a portion of the second side 113 to at least partially extend a length of the second side 113.

The second arm 120 may include an arm body 121 having an elongate shape, and a height groove 122 disposed on at least a portion of the arm body 121 to extend at least a portion of a length of the arm body 121.

The handrail installation device 100 may further include a height adjusting section 140 movably connected to at least a portion of the second arm 120 to move toward the first end of the second arm 120 in a first direction, and move toward a second end of the second arm 120 in a second direction opposite with respect to the first direction.

The height adjusting section 140 may include an adjusting body 141, and a sliding bolt 143 movably disposed on at least a portion of the adjusting body 141 and connected to the second arm 120 to move the adjusting body 141 toward the first end of the second arm 120 in the first direction, and move the adjusting body 141 toward the second end of the second arm 120 in the second direction opposite with respect to the first direction in response to movement of the sliding bolt 143.

The sliding bolt 143 may include a detent to prevent the sliding bolt 143 from automatically moving.

The handrail installation device 100 may further include a tightening bolt 150 slidably disposed on and within at least a portion of the first arm 110 to slide from a first end of the first arm 110 to at least partially toward a second end of the first arm 110, and slide from the second end of the first arm 110 to at least partially toward the first end of the first arm 110.

The tightening bolt 150 may be prevented from sliding along the first arm 110 in response to rotating in the a first rotating direction, and facilitates sliding along the first arm 110 in response to rotating in a second rotating direction opposite with respect to the first rotating direction.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A handrail installation device, comprising:
a first arm removably connected to at least a portion of a stair tread;
a second arm pivotally disposed at a first end on at least a portion of the first arm to rotate from retracted in parallel with the first arm in a first position to at least partially extended away from the first arm in a second position, and rotate from extended away from the first arm in the second position to retracted in parallel with the first arm in the first position;

a bubble level disposed on at least a portion of the second arm to identify a level surface based on a position of at least one of the first arm and the second arm; and a tightening bolt slidably disposed on and within at least a portion of the first arm to slide from a first end of the first arm to at least partially toward a second end of the first arm, and slide from the second end of the first arm to at least partially toward the first end of the first arm.

2. The handrail installation device of claim 1, wherein the first arm comprises:

a base;

a first side perpendicularly disposed away from a first edge of the base with respect to a direction; and a second side perpendicularly disposed away from a second edge of the base with respect to the direction.

3. The handrail installation device of claim 2, wherein the first arm further comprises:

a first groove disposed on and within at least a portion of the first side to at least partially extend a length of the first side; and a second groove disposed on and within at least a portion of the second side to at least partially extend a length of the second side.

4. The handrail installation device of claim 1, wherein the second arm comprises:

an arm body having an elongate shape; and a height groove disposed on at least a portion of the arm body to extend at least a portion of a length of the arm body.

5. The handrail installation device of claim 1, further comprising:

a height adjusting section movably connected to at least a portion of the second arm to move toward the first end of the second arm in a first direction, and move toward a second end of the second arm in a second direction opposite with respect to the first direction.

6. The handrail installation device of claim 5, wherein the height adjusting section comprises:

an adjusting body; and a sliding bolt movably disposed on at least a portion of the adjusting body and connected to the second arm to move the adjusting body toward the first end of the second arm in the first direction, and move the adjusting body toward the second end of the second arm in the second direction opposite with respect to the first direction in response to movement of the sliding bolt.

7. The handrail installation device of claim 6, wherein the sliding bolt comprises:

a detent to prevent the sliding bolt from automatically moving.

8. The handrail installation device of claim 1, wherein the tightening bolt is prevented from sliding along the first arm in response to rotating in the a first rotating direction, and facilitates sliding along the first arm in response to rotating in a second rotating direction opposite with respect to the first rotating direction.

9. A handrail installation device, comprising:

a first arm removably connected to at least a portion of a stair tread, the first arm comprising:

a base, a first side perpendicularly disposed away from a first edge of the base with respect to a direction, a second side perpendicularly disposed away from a second edge of the base with respect to the direction, a first groove disposed on and within at least a portion of the first side to at least partially extend a length of the first side, and a second groove disposed on and within at least a portion of the second side to at least partially extend a length of the second side;

a second arm pivotally disposed at a first end on at least a portion of the first arm to rotate from retracted in parallel with the first arm in a first position to at least partially extended away from the first arm in a second position, and rotate from extended away from the first arm in the second position to retracted in parallel with the first arm in the first position; and a bubble level disposed on at least a portion of the second arm to identify a level surface based on a position of at least one of the first arm and the second arm.

* * * * *